COMPLEMENTARY SYMMETRY TRANSISTOR COINCIDENCE DETECTOR
Filed May 8, 1957
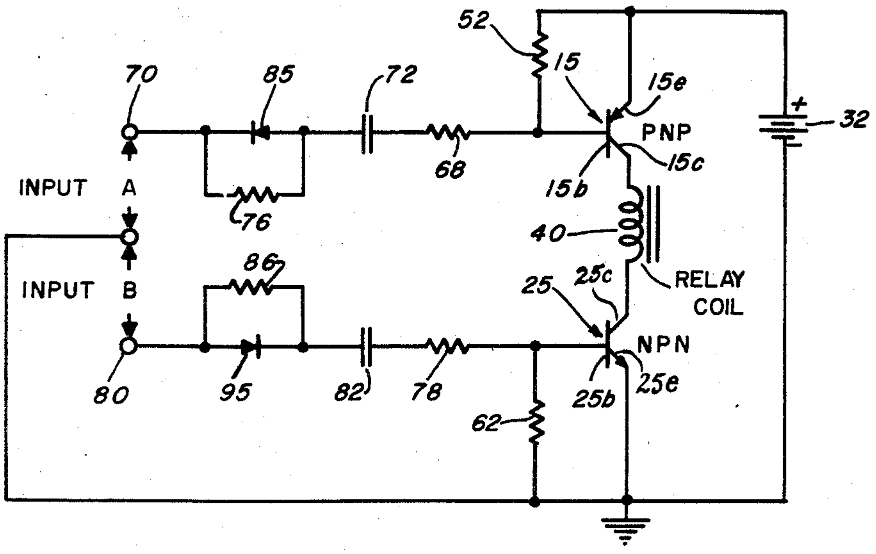
INVENTORS,
Solomon Levine
John Walter Keller, Jr.
BY
W. E. Thibodeau, T. J. Lynch, F. E. McGee & J. P. Edgerton 2,930,942

COMPLEMENTARY SYMMETRY TRANSISTOR COINCIDENCE DETECTOR

Solomon Levine, Silver Spring, Md., and John Walter Keller, Jr., Key Biscayne, Fla., assignors to the United States of America as represented by the Secretary of the Army Application May 8, 1957, Serial No. 657,985

3 Claims. (Cl. 317—148.5)

(Granted under Title 35, U.S. Code (1952), sec. 266)

The invention described herein may be manufactured and used by or for the Government for governmental purposes without the payment to us of any royalty thereon.

This invention relates to coincidence detector circuits in general, and more particularly to a novel coindence detector circuit using two transistors having complementary symmetry.

In many applications it is desirable to have a simple coincidence detector capable of responding to low voltage input pulses (less than 0.5 volt), while not responding to single high voltage input pulses (up to 20 volts), or pulses of the wrong polarity. The common 6AS6 type of coincidence detector cannot meet these extreme conditions, because biasing of the grids at just below cutoff to permit low voltage-level operation also permits the tube to conduct when a single large pulse is applied to either input grid. This limitation applies to all gating devices in which the conduction decision must be made in one "bottle" or switch. To completely isolate the two signals, the decision to conduct should be made using two switches in series. In this way, one switch, adjusted for low level operation, cannot be bypassed by the closing of the other.

If these two switches were vacuum tubes, some complicated biasing scheme would be required to permit the use of input pulses which start from ground potential. Most such biasing schemes, however, would have the disadvantage of making the two tubes interdependent. This invention solves the problem by using the complementary symmetry existing between a PNP and an NPN transistor. In a typical embodiment, two transistors having complementary symmetry are put in series. No biasing scheme is required in such a series connection, so that the action of the switches will be independent.

One object of this invention is to provide an improved coincidence detector circuit.

Another object is to provide a coincidence detector circuit using transistors in place of vacuum tubes.

A further object of this invention is to provide a simple coincidence detector circuit which will operate on low voltage input pulses.

Still another object is to provide a simple coincidence detector which will operate on low voltage input pulses while not responding to single high voltage input pulses or pulses of the wrong polarity.

The specific nature of the invention, as well as other objects, uses, and advantages thereof, will clearly appear from the following description and from the accompanying drawing, in which the figure is a circuit diagram of a complementary symmetry transistor coincidence circuit in accordance with the invention.

In the figure, a PNP transistor 15 having an emitter **15*e*, a base 15*b* and a collector 15*c* has its emitter 15*e* connected to a positive voltage source 32 and its collector 15*c* connected to one end of a relay coil 40, a resistor 52 being connected between the base 15*b* and the emitter 15*e*. An NPN transistor 25 having an emitter 25*e*, a base 25*b* and a collector 25*c* has its emitter 25*e* connected to circuit ground and its collector 25*c* connected to the other end of the relay coil 40, a resistor 62 being connected between the base 25*b* and the emitter 25*e***.

The two input pulses for which it is desired to obtain coincidence detection are applied from circuit ground to the input terminals 70 and 80. The pulse applied to terminal 70 is applied to the base **15*b* of the PNP transistor 15 through an input network comprising a resistor 68 and a D.-C. blocking capacitor 72 in series with the parallel combination of a diode 85 and a resistor 76. The pulse applied to terminal 80 is applied to the base 25*b* of the NPN transistor 25 through an input network comprising a resistor 78 and a D.-C. blocking capacitor 82 in series with the parallel combination of a diode 95 and a resistor 86. The diode 85 in the input network of the PNP transistor 15 is connected to pass only negative input pulses and the diode 95 in the input network of the NPN transistor 25** is connected to pass only positive input pulses.

With no pulses applied to the input terminals 70 and 80 both the PNP and NPN transistors will be in a low conduction state, as a result of the biasing provided by resistors 52 and 62. Since the relay coil 40 is in series with both transistors 15 and 25, the relay can receive an operating pulse only when both transistors 15 and 25 are in high conduction states simultaneously, which occurs when two simultaneous pulses having negative and positive polarities and at least a predetermined minimum value, are applied to terminals 70 and 80 respectively. The diode 85 protects the PNP transistor 15 from large back-voltages, while the resistor 68 protects the PNP transistor 15 from the large forward voltages. The resistor 76 is provided to prevent the D.-C. blocking capacitor from becoming charged with successive pulses. The functions of the diode 95, the resistor 78 and the resistor 86 are identical for the NPN transistor 25.

Because of the unique back-to-back property of the circuit of Figure 1 which is made available by complementary symmetry, the triggering reference for one transistor is independent of the other. The reference for the PNP transistor 15 is the positive voltage source 32 or A.-C. ground, while the reference for the NPN transistor 25 is D.-C. ground. The collector resistance of each transistor isolates it from the other.

The relay coil 40 of Figure 1 is used only for purposes of illustration since any other type of sensing device could be employed. For example, another simple type of sensing device could be a high frequency pulse transformer operating into another transistor or vacuum tube.

It will be apparent that the embodiment shown is only exemplary and that various modifications can be made in construction and arrangement within the scope of the invention as defined in the appended claims.

We claim:

1. A transistor coincidence detector circuit comprising in combination: a sensing device, a PNP transistor having emitter, base and collector elements, an NPN transistor having emitter, base and collector elements, said collectors being connected to opposite ends of said sensing device, said PNP transistor emitter being connected to a positive voltage source having a grounded end, and said NPN transistor emitter being connected to circuit ground, a first resistor connected between the ungrounded end of said positive voltage source and said PNP transistor base, and a second resistor connected between circuit ground and said NPN transistor base, both transistors being adapted to be in a low conduction state, and means for applying a first pulse between said PNP transistor base and circuit ground and a second pulse between said NPN transistor base and circuit ground, said sensing device receiving an operating pulse when said first and second pulses are simultaneously applied having negative and positive polarities respectively and at least a predetermined minimum value, whereupon both transistors enter high conduction states simultaneously.

2. The invention in accordance with claim 1 wherein said sensing device is a relay, said transistor collectors being connected to opposite ends of the relay coil of said relay.

3. The invention in accordance with claim 2, there being additionally provided: a first input network comprising a first resistor and a first diode in series through which said first pulse is applied to said PNP transistor base, said first diode being connected to pass negative input pulses, and a second input network comprising a second resistor and a second diode in series through which said second pulse is applied to said NPN transistor base, said second diode being connected to pass positive pulses, said input networks protecting the respective transistors to which they are connected from overload voltages.

References Cited in the file of this patent

UNITED STATES PATENTS

| | | |
|---|---|---|
| 2,698,392 | Herman | Dec. 28, 1954 |
| 2,770,728 | Herzog | Nov. 13, 1956 |
| 2,802,938 | Herzog | Aug. 13, 1957 |
| 2,820,143 | D'Nelly et al. | Jan. 14, 1958 |
| 2,853,633 | McVey | Sept. 23, 1958 |